Nov. 16, 1937.  F. L. O. WADSWORTH  2,099,088
METHOD AND APPARATUS FOR FEEDING MOLTEN GLASS
Original Filed June 25, 1934   2 Sheets-Sheet 2
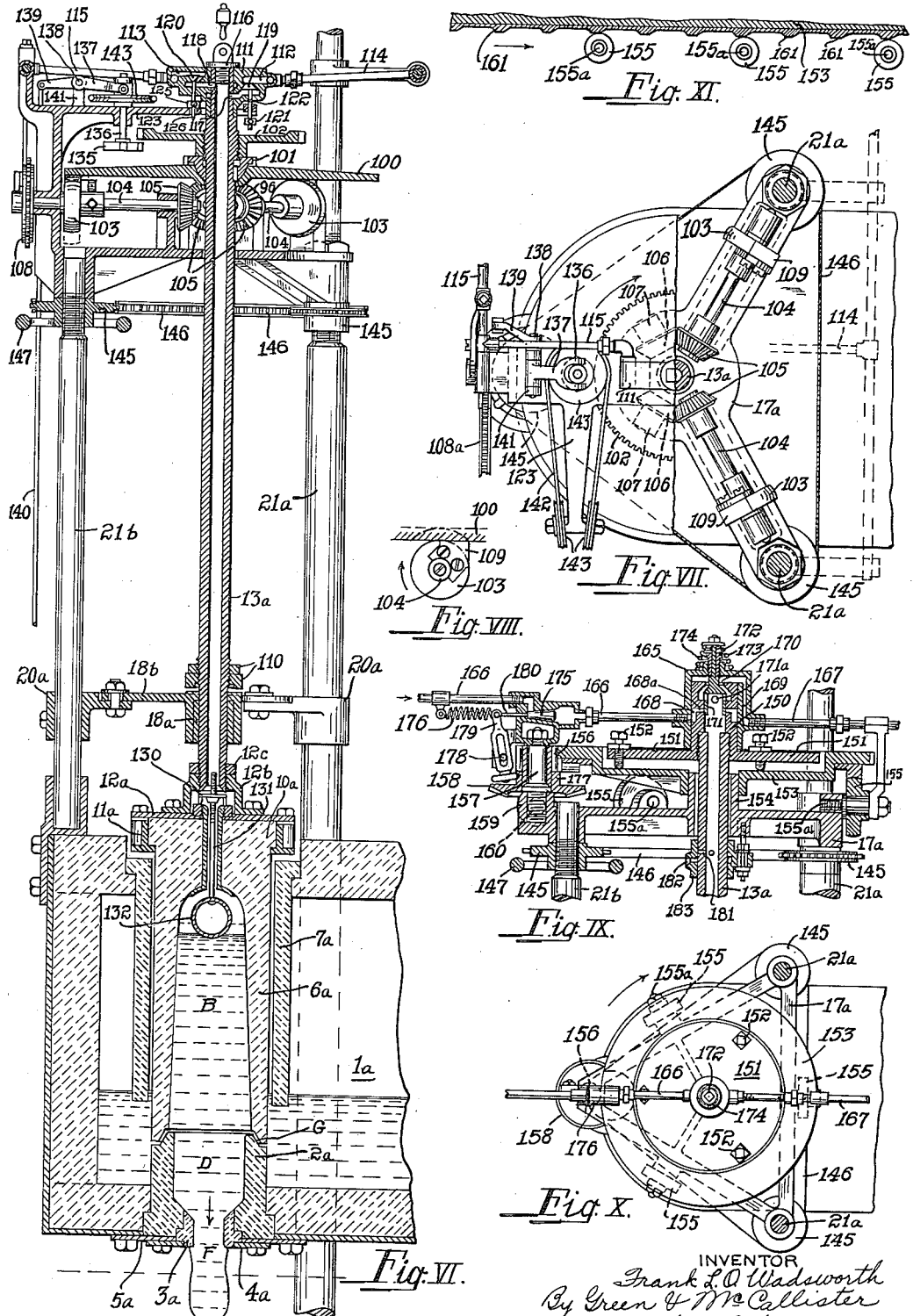

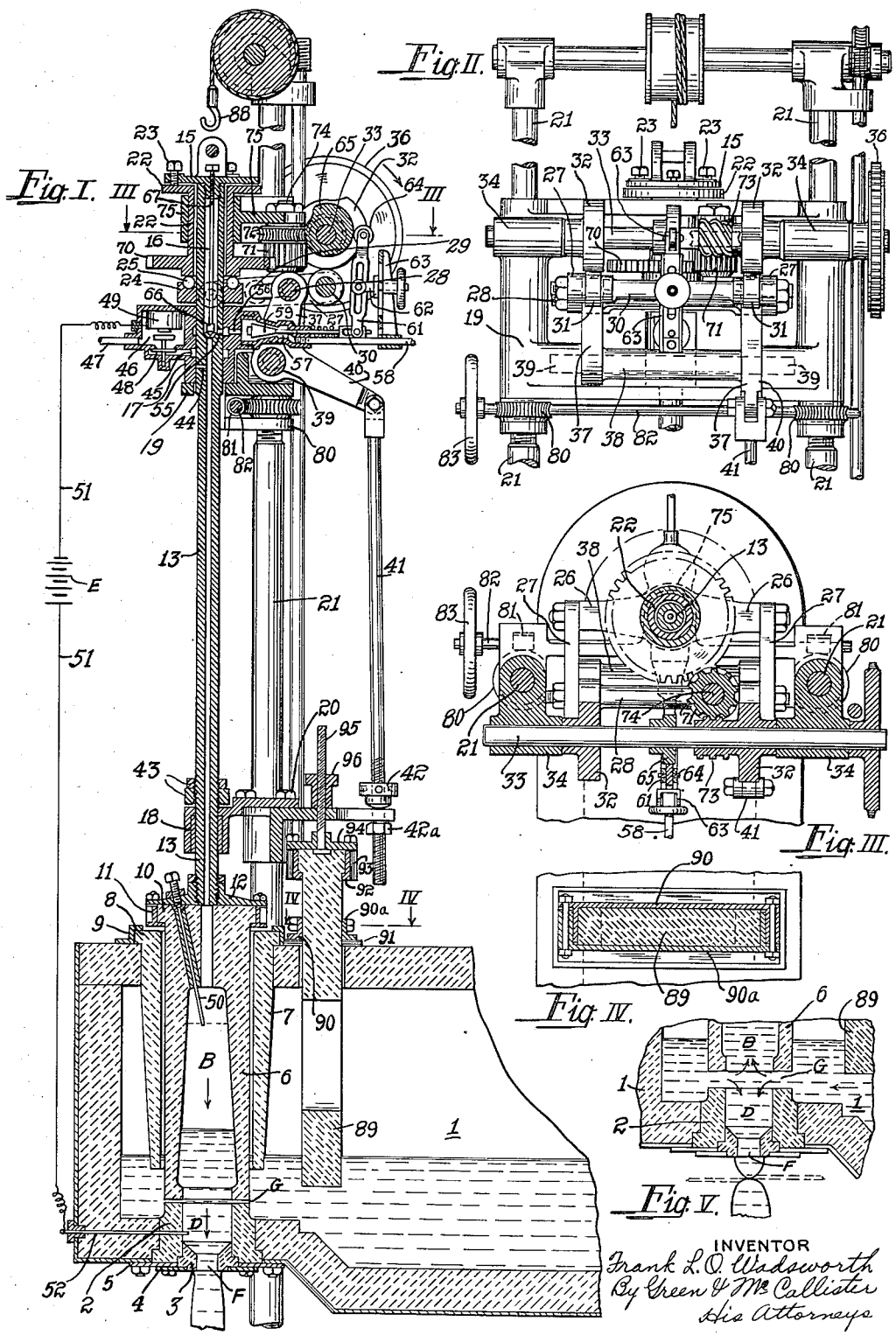

Patented Nov. 16, 1937

2,099,088

UNITED STATES PATENT OFFICE 2,099,088

METHOD AND APPARATUS FOR FEEDING MOLTEN GLASS

Frank L. O. Wadsworth, Pittsburgh, Pa., assignor to Ball Brothers Company, Muncie, Ind., a corporation of Indiana Application June 25, 1934, Serial No. 732,216
Renewed January 14, 1937

22 Claims. (Cl. 49—55)

This invention relates to a pneumatic feeder for delivering a series of separately formed mold charges of molten glass from a continuous source of supply, and more particularly, to an improvement in the type of pneumatic feeder generally illustrated in McCauley Patent No. 1,322,318 issued November 18, 1919.

In the so-called McCauley type of feeder a succession of predetermined quotas of the material are periodically accumulated in, and extruded from, a segregation chamber which is positioned above, and has its lower end spaced from, a suitably shaped discharge orifice in the floor of the supply reservoir, by alternately connecting the interior of the chamber to sources of vacuum and pressure. While the segregation chamber may be manually moved up and down, relative to the discharge orifice, to vary the area of the passage between the segregation chamber and the supply reservoir, and thus regulate the volume of the successively formed charges, the chamber is not moved, once the proper volume is secured, and the passage remains fixed or constant during the continued operation of the feeder. The area of this passage is not only substantially constant but is so restricted, that when the chamber is connected to pressure, a portion of the glass in the chamber will be expelled through the orifice and not forced back through the passage into the supply reservoir. As a result of having such a restricted passage between the segregation chamber and the reservoir, the natural flow from the reservoir to the orifice at the end of the pressure period, is retarded; and when the glass in the chamber is subjected to vacuum or suction, there is a complete stoppage of flow through the orifice, and oftentimes, even a reversal of flow, whereby the material is retracted or drawn back through the orifice into the segregation chamber. This results in a considerable loss of time between the formation of successive mold charges, and materially retards the speed of operation of the apparatus.

The principal object of this invention is to provide a continuous flow feeder in which there is no reversal or stoppage of flow at the orifice, and in which the mold charges are delivered therefrom in a continuously flowing stream having regularly recurrent enlarged portions, connected together by sections of reduced diameters. I attain this object by automatically varying the area of the passage between the segregation chamber and the supply reservoir, at the beginning and end of each accumulation and extrusion period, in exact and regulated synchronism with the corresponding vacuum and pressure applications, thereby more efficiently and effectively controlling the flow of the molten glass into and out of said chamber during each successive cycle of mold charge formation.

This method of procedure enables me to minimize, and in large part to eliminate, the loss of time and the concomitant arrest of the discharge due to the usual stopping and retardation of the outflow of glass from the delivery orifice during the application of the sub-atmospheric (vacuum) pressure; and also enables me to substantially augment the rate of discharge during the period of super-atmospheric pressure application. The effect of eliminating the arrest or retardation of the outflowing glass and augmenting the rate of discharge during the pressure period, also enables me to substantially increase the rate of mold charge formation, and eliminate to a great extent the chilling and loss of heat in the mold charge during its formation; and to also preshape the successive mold charges preliminary to their severance and delivery to the forming machine.

This and other objects, purposes and advantages of the present invention will be rendered apparent to those skilled in the particular art by the accompanying illustrations and descriptions of the two exemplary embodiments of this invention, wherein:

Figure I is a longitudinal vertical section through the center of the flow orifice and the supply reservoir of one form of my improved feeder;

Fig. II is a rear elevation of the upper portion of the mechanism shown in Fig. I;

Fig. III is a sectional plan view on the plane III—III of Fig. I;

Fig. IV is a fragmentary section on the plane IV—IV of Fig. I;

Fig. V is a fragmentary sectional view on the plane of Fig. I showing the position of the parts when the segregation chamber is raised to its upper position;

Fig. VI is a longitudinal vertical section, similar to the one shown in Fig. I and illustrates another exemplification of my invention;

Fig. VII is a top plan view of the apparatus illustrated in Fig. VI with a portion of the mechanism broken away to show the parts beneath it;

Fig. VIII is an enlarged view of one of the roller elements of the mechanism illustrated in Figs. VI and VII;

Fig. IX is a longitudinal sectional view illustrating a modified form of a portion of the apparatus shown in Fig. VI;

Fig. X is a top plan view of the apparatus illustrated in Fig. IX;

Fig. XI is a developed circumferential section showing the cam track and supporting rollers which form a part of this same apparatus.

In the construction illustrated in Figs. I–V, inclusive, the parent pool or mass, from which the molten material is to be fed, is contained in a forehearth 1 which extends out from the front of a large melting tank or furnace (not shown). The forehearth 1 is provided, at its forward end, with a delivery chamber D formed in an annular block 2 which is mounted in an aperture in the floor of the forehearth and extends a substantial distance thereabove. The lower end of the chamber D is partially closed by a removable flow bushing or ring 3, which defines the size of the delivery orifice F, and which is held in position against the bottom of the forehearth by a plate 4 bolted to a plate 5 which in turn is bolted to the bottom of the forehearth 1 and supports the floor block 2.

In delivering a series of separately formed mold charges through the orifice F, a quantity of the molten material in the forehearth is periodically accumulated in and expelled from a segregation chamber B formed in a reciprocating air bell 6 which is positioned above the floor block 2. The material is accumulated in the chamber B at the time when the bell is moved away from the block 2 to open a passage G between the segregation chamber B and the forehearth 1 (see Fig. V); and the material is expelled therefrom, through the orifice F, after the bell has been moved toward the floor block 2 to restrict the passageway G (see Fig. I).

The bell 6, which is made of any suitable refractory material, extends upwardly through an opening in the roof of the forehearth and is encircled by a refractory guard sleeve 7 which is provided with a shoulder 8, that is seated on the roof of the forehearth, and is held in place by a metallic clamping member 9 secured thereto. This guard sleeve extends downwardly into the molten glass in the forehearth chamber, and forms therewith a liquid seal that effectually prevents the escape of hot gases from the roof opening.

The upper end of the bell 6 terminates in an enlarged head 10 which is engaged by a flanged clamping ring 11, that is detachably secured to a cap 12 on the lower end of a tubular rod 13. The lower end of this tube is in registry with a central passageway in the top of the bell 6, and its upper end is closed by an enlarged cap plate 15 that is threaded into an enlarged portion 16 of the bore. The rod 13 is slidably and rotatably supported in upper and lower bearings 17 and 18 which are carried by upper and lower crossheads, 19 and 20, that are mounted on the side posts, 21—21, of the metal frame or boot which surrounds the forehearth structure.

In order to reciprocate the rod 13, and alternately raise and lower the bell 6—and thus periodically open and close (or nearly close) the passageway G—I provide a flanged sleeve 22 which encircles the tubular rod 13, and is engaged by three adjustable set screws 23, that are threaded through the cap plate 15. The lower end of this sleeve is supported on a ring of balls 25 which are carried by a collar 24; and this collar is, in turn, provided with laterally extending side arms 26—26 (see Fig. III) which are pivotally attached to the outer ends of a pair of slotted links 27—27, that are rockably supported on a cross shaft 28. The inner (or right hand) ends of the links 27 are cross connected by another shaft 30, which carries two cam rollers 31—31 that are engaged by the cams 32—32 on the shaft 33. This shaft is mounted in bearings 34—34 on the crosshead 19 and is provided with a sprocket wheel 36 which is continuously driven, in the direction of the arrow, Fig. I, from any suitable motor (none shown). As the cam shaft revolves the connected links 27—27 are rocked up and down on their cross shaft support 28, and the collar 24—together with the parts, 22—15—13, supported thereon—is raised and lowered to impart a corresponding movement to the bell 6.

In order to change the range of up and down movement of the bell members the rock shaft support 28—which passes through the slots in the links 27, 27—is mounted in the upper ends of a pair of arms 37—37, which are rigidly connected to each other by a sleeve hub 38, and which are rockably supported on the crosshead 19 by the trunnion pin 39; and one of these arms is provided with a lateral extension 40 that is connected to the upper end of a rod 41, which extends downwardly through an opening in the lower crosshead 20, and which is held in adjustable relation thereto by the lock nuts 42 and 42a. By varying the position of these nuts the connected members 37—38 and 40 may be rocked back and forth on the trunnion support 39 to shift the position of the rock shaft 28 in the slots, 29—29, and thereby alter the angular throw of the link arms, 27—27.

The downward movement of the bell 6 is limited by the lock nuts 43 which are threaded on the rod 13 and which are adapted to engage the upper surface of the bearing 18 and thus prevent the actual physical contact of the lower end of the bell 6 with the adjacent surface of the annular floor block 2.

In order to facilitate the periodic accumulation of material in the chamber B, I provide means for connecting the communicating passageways in the bell 6 and its tubular support 13, with a vacuum conduit 47; when the bell has been raised to its upper position. In the construction now under consideration, the connection is effected by providing the rod 13 with a side port 44 which is moved into registry with an annular groove and passageway 45 in the upper bearing member 17, and which is thereby put into communication with the valve chamber 46 and the vacuum conduit 47.

The portion or quota of material being accumulated within the segregation chamber B is prevented from rising above a predetermined level therein, by an electrically operated valve 48 which is adapted to close the passageway 45 and thus shut off further communication between the chamber B and the source of sub-atmospheric or vacuum pressure. The valve 48 is actuated by an electromagnet 49 positioned in the valve chamber 46 and having one of its terminals connected, (through the bearing 17, the rod 13 and the cap 12), with an electrode 50 that extends through the upper end of the bell 6 into the top of the chamber B; and having its other terminal connected (through the battery E and the insulated conductors 51—51) to a second electrode 52 that extends into the delivery chamber D. It is apparent that when the material, rising in the chamber B, comes in contact with the electrode 50, the battery circuit is closed and the magnet 49 is energized to lift the valve 48; thereby cutting off communication between the vacuum connection 47 and the chamber B, and arresting the further rise of molten material therein.

In order to assist the expulsion of the glass from the chamber B provision is also made for the admission of compressed fluid thereinto at the time when the air bell 6 is in its lowermost position, and the passageway G, is correspondingly throttled to prevent or restrict the backflow of molten material to the supply reservoir. As here shown (Fig. I) this action is effected by providing the tubular rod 13 with another lateral port opening 55 which is brought into registry with an annular groove and passageway 56 in the upper bearing block 17—when the rod is moved down—and which is thereby put into communication with a valve chamber 57 that is supplied with compressed air through a pipe 58. The flow of air to the valve chamber 57 is controlled by a needle valve 59 whose stem is adjustably connected to the lower end of a slotted lever 61 that is rockably mounted on a vertically adjustable pivot block 62. The upper end of the lever 61 carries a roller 64 which is engaged by a cam 65 on the shaft 33; and a coil spring 66, disposed between the head of the valve stem and the adjacent end of the valve chamber 57 tends to hold the needle valve 59 in its closed position. The volume of compressed fluid delivered to the chamber B may be further regulated by a plug valve 67 which is mounted in the enlarged bore section 16 of the rod 13, and is manually operable through the stem 67 that is threaded into the cap 15. The opening and closing movements of the needle valve 59 may be varied, at will, by moving the pivot block 62 up and down on its bracket support 63, and by shifting the point of connection between the head of the needle valve stem and the lever 61; and these two adjustments, together with that of the plug valve 67 furnish means for the complete control of the flow of compressed air to the upper end of the segregation chamber B.

In order to stir and agitate the material in the forehearth and thus prevent localized changes in the temperature or the physical composition of the material in the outer end thereof, I prefer to rotate the bell 6 during the operation of the feeder. This rotation is effected through the frictional engagement of the cap screws 23 with the upper surface of the flanged sleeve 22 which in this case, is revolved, at a constant speed, by a spur gear 70 which is attached to the lower end of the sleeve 22, and which is engaged by an elongated pinion 71 that is keyed or otherwise secured to the hub of a worm wheel 72, and is driven by a worm 73 on the shaft 33. The connected gear elements 71 and 72 are revolubly mounted on a fixed stud bolt 74, which is carried by the crosshead 19; and the rotating sleeve members 22—70 are also preferably supported—independently of the shaft member 13—by a collar bearing 75 that is also carried by this crosshead.

In order that the position of the air bell 6 may be readily adjusted to vary the area of the passageway G, the upper crosshead 19 which supports the entire operative mechanism for reciprocating and rotating the bell members is slidably mounted on the posts 21—21, and is supported by worm wheel nuts 80—80 which are threaded thereon, and which may be turned in unison by a pair of worms 81—81 on the cross shaft 82. When the shaft 82 is rotated—e. g. by turning the handwheel 83—the crosshead 19 may be bodily raised and lowered, to vary the degree of opening of the passageway G, during the reciprocation of the air bell 6, without altering the range of the reciprocatory movement.

When it is desired to replace the air bell 6 for any reason, this member may be readily withdrawn from the forehearth by simply detaching the bearing 18 from the lower crosshead support 20 and connecting the cap 15 to the cable hook 88 of a suitable hoisting mechanism. The tubular rod 13 may then be drawn upwardly through the bearing 17 and the encircling sleeve members 22—24, etc., without disturbing any of the other parts of the feeder assembly.

When the apparatus is to be shut down for the purpose of changing the air bell or any other reason, the glass in the forehearth 1 is prevented from flowing into the discharge chamber D by means of a gate or baffle block 89 which is adapted to be lowered into contact with the floor of the forehearth. The gate 89 extends through an opening in the roof of the forehearth, and is supported thereon by means of angle members 90 and 90a, (Fig. IV) which are clamped to the sides of the gate and rest upon the top of the furnace. Suitable pads of insulating material, 91, may be disposed between the bottom of the angles and the roof of the forehearth to more effectively seal the opening through which the block 89 passes, and prevent the gases in the forehearth from escaping therethrough. The top of the gate block 89 is provided with an enlarged head 92 which is engaged by angle bars 93—93 that are clamped against a cap 94; and the latter is connected to a threaded rod 95 which extends up through the lower crosshead 20, and is supported therefrom by an adjustable nut 96.

When the gate 89 is in its upper position, the lower end projects into the material in the forehearth and acts as a skimmer to prevent the impurities on the surface of the molten glass from flowing into the chamber D.

When the apparatus is in operation, and the parts are in the position shown in Fig. I, the air bell 6 is depressed to throttle or restrict the supply passage G, and the cam 65 is holding the valve 59 in its open position to admit compressed air from the pipe 58, through the passages and ports 56—55 and the tubular rod 13 to the chamber B;—thus supplementing the action of gravity in expelling the molten material from the orifice F. When a sufficient quantity of this material has thus been expelled, the cam 65 releases the roller 64 and permits the spring 66 to close the valve 59; and concurrently therewith, or in close timed relationship thereto, the cams 32 come into action to rock the links 27—27 on their shaft support 29 and thus lift the interengaged collar sleeve cap and tube members, 24—22—15—13, to raise the bell 6 and open the passage G. As the rod 13 moves upwardly, the port 55 is moved out of register with the port 56 and a residual quota of compressed air is trapped in the now closed space above the surface of the glass in the bell 6. This trapped body of compressed fluid acts to continue the expulsion of the molten material from the delivery orifice while the bell is being lifted, and thus prevents any retardation or retraction of the outflowing stream by such upward movement. When the bell has nearly reached the upper limits of its travel, and the passage G is substantially wide open, the port 44 comes in registration with the groove 45, and the interior of the bell is then connected through the pipe 47 to a suction pump or other suitable source of sub-atmospheric pressure; which correspondingly accelerates the flow of molten material from the forehearth, into the segregation chamber B.

Before the port 44 comes in registration with the recess 45, the passageway G, between the segregation chamber B and the forehearth 1, is substantially wide open and molten material is then moving, under the influence of gravity, from the forehearth to the chamber D, and is flowing directly therefrom in an unrestrained stream through the orifice F. As a result of reestablishing this direct gravity flow from the main supply reservoir, before moving the ports 44 and 45 into registration, there is no retardation or arrest of the delivery from the orifice F upon the initial application of suction to the chamber B; and the glass will be raised therein without materially affecting the concurrent outflow through the orifice. This attainment of this condition of non-arrested or non-retractive delivery is greatly facilitated by the fact that the area of the opened passageway G is much greater than that of the opening F; and the glass will therefore flow into the chambers D and B much more rapidly than it can escape therefrom through the delivery orifice.

As the glass is drawn into the chamber B, under the action of the vacuum, it will rise therein until it comes into contact with the terminal 50 and complete the electrical circuit, through the electromagnet 49, thus lifting the valve 48 and closing the connection between the segregation chamber B and the vacuum conduit 47. This automatic closure of the vacuum connection permits of the use of a relatively high vacuum—which facilitates and accelerates the recharging of the segregation chamber—without incurring any danger of overfilling this chamber and choking the air passage to the pipe opening 14.

As soon as the desired quantity of glass has been drawn into the bell 6 the cams 33 release the rollers 34 and permit the air bell 6 to drop, by gravity until the stop nuts 43 engage the upper end of the bearing 18. As the rod 13 starts to move downwardly the port 44 is moved out of registration with the groove 45, and near the end of this downward movement—when the passageway G is substantially closed—the port 55 comes in registration with the recess 56 and compressed air is again admitted to the chamber B (under the control of the valves 59 and 67) to assist the action of gravity in accelerating the outflow from the delivery orifice F. This completes one cycle of feeding action.

Figs. VI to VIII, inclusive, illustrate another exemplification of my invention in which an alternative form of operating mechanism is used for reciprocating and rotating the air bell. In this exemplification, as in the one previously described, the parent pool of molten material from which the mold charges are to be fed is contained in the forehearth 1a having near its outer end, a delivery chamber D which is formed in a block 2a mounted in the floor of the forehearth. The bottom of the delivery chamber D is partially closed by the removable flow bushing or ring 3a that defines the size of the flow orifice F. The bushing 3a is held in place by means of a plate 4a bolted to a plate 5a which in turn is bolted to the bottom of the forehearth and supports the block 2a.

In feeding a series of mold charges from the flow orifice F, a quota of material is segregated in a chamber B which is formed in a reciprocating air bell 6a that is positioned above and in axial alignment with the annular floor block 2a. This quota is accumulated in the chamber B when the bell 6a is raised to open the passageway G between the contiguous ends of the bell and delivery block members 6a—3a; and is expelled through the orifice F when the bell has been lowered to throttle and substantially close this passageway, and thus prevent any material backflow of the segregated charge into the forehearth or supply reservoir. The bell 6a extends upwardly through a sealing sleeve 7a, mounted in the roof of the forehearth, and terminates at its upper end in an enlarged head 10a which is engaged by the flanged clamp ring 11a and an associated cap plate 12a. The clamping action of these connected members, on the head of the bell 6a, is in this case, supplemented by a tubular bolt of nichrome, or other suitable shearably resistant metal which passes up through the closed end of the bell 6a and is provided with a nut that is screwed down on the cap plate 12a. The cap plate 12a is, in turn, connected to a vertically extending tubular member 13a by means of a flange coupling 12b, and a lock nut 12c. The lower end of the tube 13a is slidably and rotatably mounted in a bearing 18a which is detachably bolted to collars 20a—20a that are carried by the forehearth frame posts 21a—21b; and the upper end of this tube extends through a triangular shaped frame 17a which is slidably mounted on these same posts, and is supported in position thereon by an interconnected set of nuts which will be described later.

In order to rotate the air bell 6a, and thus stir or agitate the material in the outer end of the forehearth, the bell 6a and tube 13a are supported on a constantly revolving annular head 100 which is engaged at its center with a hemispherical head 101 that is splined to the tube 13a, and is held in an axially adjustable position thereon by a gear nut 102. The head 100 is supported on, and frictionally driven by rollers 103—103—103 secured to the outer ends of shafts 104—104—104 rotatably mounted in suitable bearings on the frame 17a and which are rotated, in unison, in the same direction and at the same speed, by a train of interengaged bevel gears 105—106—105—106—105—106. This train of gearing is driven from a sprocket wheel 108, which is secured to the outer end of one of the shafts 104, and is connected to a suitable motor, (not shown), by the sprocket chain 108a.

In order to periodically raise and lower the air bell 6a, and thus open and close, (or nearly close), the passageway G, each of the rollers 103 is provided with a triangular cam member 109, (Fig. VIII) which is detachably secured thereto and which projects beyond the periphery thereof; and at each revolution of the positively driven rollers this projecting lug engages the under face of the head 100, and acts to lift this member, and with it the connected bell support elements 101—102—13a—12b, etc. The return downward movement of the bell 6a is limited by means of the double lock nuts 110 which are adjustably mounted on the tube 13a above the bearing 18a.

In order to alternately connect the segregation chamber B to sources of vacuum and of pressure, when the bell is successively raised and lowered, the upper end of the tube 13a is provided with an annular valve housing 111 which is clamped thereto by a flanged screw plug 116, and which is divided into two chambers, 112—113, that are respectively connected, by the pipes 114—115, with suitable sources of sub-atmospheric and super-atmospheric pressures. The valve chambers 112—113 are respectively connected with the interior of the tube 13a by ports 117 and 118 in the wall of the tube; and the admission of the sub-atmospheric and super-atmospheric pressures to these chambers is controlled by valves 119—120 mounted therein and operated by the up and down movement of the valve housing 111. When the connected tube and housing members 13a—111 move downward the valve 119 is closed by the frictional engagement of its stem 122 with a split bearing in the end of a stationary shelf 123 on the upper triangular crosshead frame 17a; and the valve 120 is positively opened by the engagement of the valve stem collar 125 with the upper surface of this same shelf. When the members 13a—111 are raised, the valve 120 is seated and carried upwardly with the valve housing, while the valve 119 is positively opened by the engagement of the valve stem collar 121 with the under side of the shelf 123. When the valve 120 is opened compressed air is admitted from the conduit 115 to the upper end of the bell 6a; and supplements the action of gravity in expelling the molten material from the chamber B (the passage G now being substantially closed); and when the valve 119 is opened the air is withdrawn from the bell chamber by its connection with the vacuum conduit 114; and the glass is drawn from the main forehearth reservoir into the chamber, through the now wide open passage G.

In order to prevent the molten material from being raised beyond a predetermined level in the chamber B, when it is subjected to a low sub-atmospheric pressure, I here provide a hollow float 132, of refractory metal; which is connected, by a threaded stem 131, with an adjustable disc valve 130, which is adapted to close the lower end of the tube 13a when the float 132 is lifted by the rising column of glass in the bell chamber. This valve is held closed by the upward pressure on the float and by the suction on its upper side, until compressed air is again admitted to the tube 13a (on its downward movement).

In order to vary the area of the passageway G, I provide dual mechanisms, one of which is for turning the gear nut 102 to move the head 101 up or down on the tube 13a; and the other of which is adapted to raise or lower the frame 17a on the posts 21a—21b. The mechanism for turning the gear 102 comprises a pinion 135 which is secured to the end of a vertical shaft 136 that is slidably journaled in the shelf 123 and can be moved up and down to bring the pinion 135 into and out of mesh with the gear 102. The shaft 136 is raised and lowered by a bifurcated shift lever 137, which is keyed to a short horizontal shaft 138, that is journaled in a bracket 141 on the shelf 123, and is provided with a second lever 139 from which a hand rod 140 is extended downwardly to a point within easy reach of the machine tender. The gears 135 and 102 are engaged by pulling down on the rod 140; and when this has been done, the shaft 136 may be rotated to move the gear nut 102 up or down on the tube 13a by means of the wire cord and pulley elements 142—143—143.

The mechanism for moving the frame 17a up and down on the posts 21a—21a and 21b comprises sprocket wheel nuts 145—145—145 which are threaded on the posts 21a—21a—21b and which are connected together by a sprocket chain 146, so that they may be turned in unison by a handwheel 147 secured to one of the sprocket wheels 145.

In Figs. IX, X, and XI, I have illustrated another arrangement of operating means for reciprocating and rotating the air bell 6a; and for controlling the applications of pressure and vacuum to the glass in the segregation chamber B. In this construction, the upper end of the tube 13a is threaded into the hollow hub 150 of an annular head 151 which is provided with adjustable set screws 152, that are adapted to engage the upper surface of a large spur gear 153. This gear member is slidably and rotatably mounted on a central guide bearing 154, which is carried by the triangular crosshead frame 17a, and is supported on three rollers 155—155—155, that are revolvably mounted on the fixed stud bolt journals 155a—155a—155a. It is rotated at any desired speed by a small pinion 156 which is mounted on a vertical stud bolt 157, and which is driven from any suitable motor (not shown) through the bevel gear elements 158—159.

In order to periodically raise and lower the air bell 6a during the rotation of the gear 153, the lower surface thereof, which rides on the rollers 155—155—155, is provided with a series of uniformly spaced cam projections 161—161 (see Fig. XI), which successively engage these rollers, and raise the engaged members 153—151—13a, etc., as they pass over the roller supports.

In order to alternately connect the chamber B to sources of pressure and of vacuum, when the bell is in its lowermost and uppermost positions, the upper end of the hub 150, is closely engaged with a stationary cup-shaped casing 165, which is connected, by means of pipes 166—167, to suitable sources of super-atmospheric and sub-atmospheric pressures. The pipe 166 communicates with an annular groove 168 on the surface of the hub 150, which is pierced by a series of radial ports 168a; and the pipe 167 communicates with the upper closed end of the casing 165 through the passageway 169. The port openings 168a between the groove 168 and the interior of the hub 150, and the central opening between the upper end of the casing 165 and the hub cavity are all jointly controlled by a combination poppet-sleeve valve 170—171, which is provided with an upwardly extended stem 172 that is slidably mounted in an adjustable plug 173 in the closed end of the casing; and which is normally held against the end of this plug by the spring 174. When the bell members 6a—13a, etc. are in their raised position (as shown in Fig. IX) the head of the poppet valve element 170 is unseated and communication is thus established, through the ports 171a, between the vacuum conduit connections 167—169, and the interior of the bell tube 13a. The resultant exhaustion of air from the segregation chamber B induces a rapid inflow of glass through the now wide open supply passage G, and a correspondingly accelerated accumulation of molten material above the delivery orifice, without arresting the continuous gravity discharge therefrom. The rapidity of this recharging, or accumulation action can be controlled by the adjustment of the plug 173 which controls the degree of opening of the poppet valve 170.

On the downward movement of the bell supporting members 13a and 150—which occurs when the cam projections 161 are carried past the rollers 155—the poppet valve element 170 is seated, and if necessary carried down with the descending member 150 (against the tension of the spring 174); and the ports 168a are uncovered, thus establishing communication between the compressed air supply conduit 166 and the bell tube 13a, and subjecting the previously accumulated charge of glass in the chamber B to super-atmospheric pressure that will supplement the action of gravity in expelling the molten material from the delivery orifice;—the passageway G being now throttled, or closed to such a degree as to prevent any material backflow to the forehearth or supply reservoir.

The admission of compressed air to the interior of the chamber B is regulated and controlled by a needle valve 175 which is normally held in its closed position, by the coil spring 176, and which can be periodically opened by the action of a cam 177 on the hub of the bevel gear 158. In order to vary the time and the degree of opening of this valve the actuated and actuating elements (175—177) are connected by a slotted lever 179, which is rockably mounted on a vertically adjustable pivot pin 178; and by raising and lowering this pin the angular movement of the lever—and the resultant linear movement of the valve 175—can be controlled at will.

In order to momentarily establish a normal atmospheric pressure in the chamber B—intermediate the establishment of a sub-atmospheric and a super-atmospheric pressure therein—the tube 13a may be provided with a lateral port opening 181, which is adapted to be brought into registry with a relief port 182 in a vertically adjustable collar 183, that is slidably engaged with the tube 13a. The collar 183 is so adjusted that the ports 181—182 move past each other at the time when the tube 13a is cut off from communication with both of the conduits 166 and 167; and as a result of this the compressed air which is trapped in the segregation chamber B, by the closing of the ports 168a (on the upward movement of the bell tube 13a) is permitted to escape before the vacuum valve 170 is opened, and the effect of this opening is more immediate than it otherwise would be.

The operation of the apparatus illustrated in Figs. VI to XI inclusive, is substantially the same as that of the apparatus shown in Figs. I to V, inclusive; and the characteristic functional performance of these several illustrative embodiments of my invention should now be apparent, to those skilled in this art, without further explanation. There is, however, one feature of these improved constructions which has not heretofore been specifically mentioned. It will be observed that in all of the forms of apparatus herein illustrated and described the rotary movement of the air bell (6, 6a, 6b, etc.) is effected by a frictional engagement between a positively driven member (e. g. 70, 103 or 153), and other bell supporting members, (e. g. the parts 22—23, or 100—101, or 151—152), so that if the bell encounters any unusual or abnormal resistance to rotation these engaged parts will slip on each other, and will not impose such a strain on the heated refractory material as will cause it to fracture or "spall". This frictional driving action may also be utilized to automatically control the speed of rotation of the bell in accordance with the temperature and viscosity of the molten glass in which its lower end is immersed. It will also be observed that the slip nuts (43, or 110, etc.), which limit the downward movement of the bell, may be so adjusted with respect to the position of the driving members (70, 103 or 153) that when the bell is lowered the engagement between the driving and driven elements will be broken, and the bell will therefore remain at rest in its lowered position, and will be rotated only when it is lifted away from the adjacent ends of the delivery sleeves 2 or 2a.

From the foregoing description of these exemplifications of my improvements, it is apparent that I have provided an improved pneumatic feeder of the so-called "McCauley" type in which these is no loss of time between the formation of successive mold charges because there is never any arrest or stoppage of the flow, and no retraction of the glass in the orifice at the commencement of the vacuum application; and in which there is a continuous gravity discharge that is periodically accelerated by the application of a super-atmospheric pressure to material above the delivery orifice. As a result of these cooperative and complementary actions, the glass is extruded in a continuously flowing stream which presents a regularly recurrent series of enlarged sections, connected together by other sections or "necks" of reduced diameter.

It is further apparent that, since there is no arresting or retraction of the flow of glass, between the periods of accelerated delivery, I not only eliminate a loss of time between the formation of the successive mold charges, but I also materially decrease the heat losses and other difficulties that are encountered in an intermittent or interrupted formation of individually arrested and suspended gobs. It will also be obvious that, as a result of restricting the passage between the segregation chamber and the forehearth during the application of a supplemental pressure to the outflowing glass, a more effective and more perfectly controlled extrusion action is obtained, and a lower pressure may be used for producing any given rate of discharge from the delivery orifice. As a result of this a better regulation both of the weight, or volume, and of the shape, or contour of the successively formed stream sections, is made possible; and the desired regularity of action—in the formation of uniform mold charges—is less subject to disturbance by changes in the temperature or physical condition of the moltel glass.

I desire it to be understood that I have devised various mechanisms and procedures for feeding a continuously flowing stream of molten glass which is adapted to be severed to produce mold charges, and that such mechanisms and procedures not only structurally and functionally distinguish from the features herein claimed, but form the subject matter of and are claimed in copending applications for patent.

What I claim as new and desire to secure by Letters Patent is:

1. A feeder for delivering successive mold charges through a submerged orifice, comprising a reciprocable bell above said orifice, means for reciprocating said bell, means responsive to the movement of the bell away from said orifice for connecting the interior thereof to a source of sub-atmospheric pressure as the bell approaches the upper end of its stroke, means responsive to the movement of the bell toward said orifice for connecting the interior thereof to a source of super-atmospheric pressure at the end of its downward stroke, and means for maintaining such latter connection at the beginning of the upstroke of the bell to trap a quantity of said super-atmospheric pressure in said bell and prevent the retarding of flowing material through the orifice.

2. A feeder for delivering successive mold charges through a submerged orifice, comprising a reciprocable bell above said orifice, means for rotating said bell, means for alternately moving said bell toward and away from said orifice, means for introducing super-atmospheric and sub-atmospheric pressures into said bell at opposite ends of its travel, and means responsive to the glass level within said bell for automatically shutting off the delivery of sub-atmospheric pressure to said bell.

3. A pneumatic feeder, comprising a bell, means for rotating said bell, means for reciprocating said bell, means for connecting the interior of said bell to super-atmospheric pressure at one end of its travel, means for connecting the interior of the bell to sub-atmospheric pressure at the other end of its travel, means responsive to the glass level within said bell for automatically breaking the connection between the bell and the source of sub-atmospheric pressure, and means for adjusting the down stroke of said bell.

4. A feeder for delivering molten material through a submerged orifice in a forehearth comprising an air bell positioned in said forehearth above said orifice, a tube connected to said bell and communicating with the interior thereof, an annular head adjustably secured to said tube, means for frictionally driving said head, means carried by said driving means for periodically raising said head to raise said bell, and means for connecting said tube to super and sub-atmospheric pressures at opposite ends of its movement.

5. A mechanism of the character described comprising a bell, a tube extending upwardly from said bell, an annular head adjustably mounted on said tube, a frame surrounding said head, rollers on said frame engaging the underside of said head, means for driving said rollers to rotate said head, means on said rollers for periodically lifting said head and bell, means for introducing super-atmospheric pressure into said bell when the head is in its lowermost position, and means for introducing sub-atmospheric pressure into said bell when the head is raised by said rollers.

6. The method of delivering individual mold charges from a parent body of molten glass, which consists in establishing a gravity flow through an orifice submerged by said material, subjecting a portion of the material to suction to segregate a quota of material above the orifice while maintaining the full gravity flow therethrough, controlling the quantity of material segregated by the level of such segregated quota, and then materially restricting the flow from the parent body to the orifice while expelling the segregated quota through the orifice.

7. The method of delivering individual mold charges from a parent body of such material, which consists in establishing a gravity flow through an orifice submerged by said material, segregating a quota of material in a reciprocating chamber positioned above the orifice while maintaining the gravity flow therethrough, utilizing the glass level within said chamber to control the quantity of material segregated therein, materially restricting the flow from the parent body to the orifice, discharging the segregated quota through the orifice while such flow is restricted, and then removing the restriction to flow from between the parent body and the orifice just prior to the complete expulsion of said segregated quota.

8. A method of feeding molten glass in a suspended stream through an orifice submerged by a pool of such material which consists in segregating a quota of material in a chamber positioned above the orifice, controlling the quantity of material segregated by the glass level in said chamber, moving the chamber toward the orifice to prevent a reversal of flow from the chamber to the pool, discharging the segregated quota through the orifice, and then moving the chamber away from the orifice while maintaining a progressively varied pressure therein.

9. A method of feeding molten glass in a suspended stream through an orifice submerged by a pool of such material which consists in segregating a quota of material in a chamber positioned above the orifice, automatically controlling the quantity of material delivered to said chamber by the glass level therein, moving the chamber toward the orifice to restrict the passage between the pool and the orifice, discharging the segregated quota through the orifice, moving the chamber away from the orifice while maintaining a progressively decreasing pressure therein, and then segregating another quota of material within the chamber.

10. A method of feeding molten glass in a suspended stream through an orifice submerged by a pool of such material which consists in establishing a gravity flow of such material from the pool and through the orifice, accumulating a quota of material in a bell positioned above the orifice while maintaining such gravity flow therethrough, utilizing the glass level within said bell to control the quantity accumulated therein, periodically moving said bell toward said orifice to restrict the flow from the pool to the orifice, applying an expelling force to the quota in said bell to discharge it through the orifice during the period of restricted flow, and then removing the restriction between the pool and the orifice while maintaining a progressively varied expelling force within the chamber.

11. An apparatus for feeding molten glass comprising a forehearth having a flow orifice in the bottom thereof, an air bell reciprocably mounted above said orifice, means for reciprocating said bell, a valve operable in response to the movement of the bell toward the orifice for connecting the interior of the bell to a source of fluid pressure, means for holding said valve open at the beginning of the movement of the bell away from said orifice to trap a quantity of fluid pressure within said bell to prevent retraction of the glass at the orifice, and a valve operable in response to the movement of the bell away from the orifice for connecting the bell to a source of vacuum as it approaches the upper limit of its travel.

12. An apparatus for feeding molten glass comprising a forehearth having a flow orifice therein, an air bell reciprocably mounted above the orifice and extending into the glass within said forehearth, means for reciprocating said bell to alternately restrict and open the passageway between said pool and the orifice, means for connecting the bell to a source of fluid pressure when said passageway is restricted, means for trapping a predetermined quantity of fluid pressure within said bell as said bell begins to move away from the orifice to open the passageway between the pool and the orifice, means for connecting the bell to a source of vacuum when the passageway between the pool and the orifice is fully open, and means responsive to the glass level within said bell for automatically closing the connection between the bell and the source of vacuum.

13. A feeder for delivering successive mold charges to a submerged orifice comprising a reciprocable bell above said orifice, means for reciprocating said bell, means controlled by the movement of said bell away from the orifice for connecting said bell to a source of sub-atmospheric pressure, means controlled by the movement of said bell toward said orifice for connecting said bell to a source of super-atmospheric pressure, means for momentarily maintaining such last mentioned connection at the beginning of the upstroke of said bell to trap a quantity of super-atmospheric pressure in said bell and prevent the retarding of the flowing material through the orifice by such movement of the bell, and means responsive to the glass level within said bell for closing the connection between said bell and the source of subatmospheric pressure irrespective of the movement of said bell.

14. An apparatus for feeding molten glass comprising a forehearth having a flow orifice therein, a bell reciprocably mounted above the orifice and extending into the glass in said forehearth, means for reciprocating said bell to alternately restrict and open a passageway between said pool and said orifice, means controlled by the movement of said bell toward said orifice for connecting said bell to a source of fluid pressure when said passageway is restricted, means for momentarily maintaining said last mentioned connection to trap a predetermined quantity of fluid pressure within said bell on the initial movement of the bell away from the orifice to open the passageway between the pool and the orifice to prevent any retraction of the material flowing through the orifice, and means controlled by the movement of the bell away from the orifice and adapted to be operated thereby when the passageway between the pool and the orifice is fully open for connecting the bell to a source of vacuum.

15. A method of feeding molten glass in a suspended stream through an orifice submerged by a pool of such material, which consists in establishing a gravity flow of molten glass from said pool and through said orifice, accumulating a quota of molten glass in a bell reciprocating above said orifice, controlling the quantity of glass so accumulated in accordance with the level of the glass within said bell, and then discharging the accumulated quota from said bell and through said orifice.

16. A method of feeding molten glass in a suspended stream through an orifice submerged by a pool of such material, which consists in reciprocating a bell above said orifice to first establish a flow of glass from said pool and through said orifice and to then restrict such flow, connecting the interior of said bell to a source of vacuum while the flow of glass from the pool through the orifice is established to accumulate a quota of glass therein, utilizing the glass level within said bell to close said vacuum connection to control the amount of glass so accumulated and then discharging the accumulated quota from said bell and through said orifice during the period of restricted flow.

17. A method of feeding molten glass in a suspended stream through an orifice submerged by a pool of such material which consists in moving a bell alternately away from and toward said orifice to first establish a flow from said pool through said orifice and to then restrict such flow, accumulating a quota of glass within said bell during the period of unrestricted flow from the pool through the orifice, utilizing the glass level within said bell to control the quantity so accumulated therein, and discharging the accumulated quota from the bell and through the orifice while the flow from the pool through the orifice is restricted.

18. A method of feeding molten glass in a suspended stream through an orifice submerged by a pool of such material, which consists in moving a bell alternately away from and toward said orifice to first establish a flow from said pool through said orifice and to then restrict such flow, accumulating a quota of glass within said bell during the period of unrestricted flow from the pool through the orifice, utilizing the glass level within said bell to control the quantity of glass so accumulated therein, applying a discharging force to the accumulated quota within said bell while the flow from the pool to the orifice is restricted to discharge such quota through the orifice, and continuing the application of such force after the bell has started moving away from said orifice.

19. A method of feeding molten glass in a suspended stream through an orifice submerged by a pool of such material, which consists in moving a bell alternately away from and toward said orifice to first establish a gravity flow from said pool through said orifice and to then restrict such flow, connecting the interior of such bell to a source of suction during the period of unrestricted flow from said pool through said orifice to accumulate a quota of glass therein, utilizing the glass level within said bell to close said suction connection, applying a discharging force to the accumulated quota within said bell while the flow from the pool to the orifice is restricted, and continuing the application of such force after the bell has started to move away from said orifice.

20. A glass feeder comprising a forehearth having an outlet in the bottom thereof, a bell projecting into said forehearth in alignment with said outlet, means for alternately moving said bell toward and away from said outlet, means for introducing superatmospheric and subatmospheric pressures into said bell at opposite ends of its travel, and means responsive to the glass level within said bell for automatically shutting off the delivery of subatmospheric pressure thereto.

21. A glass feeder comprising a forehearth having an orifice in the bottom thereof, a bell projecting into said forehearth in alignment with said orifice, friction means for rotating and reciprocating said bell, and means for connecting said bell to sources of super- and subatmospheric pressures at opposite ends of its reciprocable movement.

22. A glass feeder comprising a forehearth having an orifice in the bottom thereof, an air bell projecting into said forehearth above said orifice, means for rotating and reciprocating said bell including friction rollers having cam-like projections thereon, and means for connecting said bell to sources of super- and subatmospheric pressures at opposite ends of its reciprocable movement.

FRANK L. O. WADSWORTH.